United States Patent [19]

Vande Berg

[11] Patent Number: 5,584,249

[45] Date of Patent: Dec. 17, 1996

[54] SHACKLE SNUBBER FOR CARCASS CARRIERS

[75] Inventor: David M. Vande Berg, Sioux Center, Iowa

[73] Assignee: Vande Berg Scales, Sioux Center, Iowa

[21] Appl. No.: 630,713

[22] Filed: Apr. 8, 1996

[51] Int. Cl.⁶ ........................................ B61K 7/02
[52] U.S. Cl. .................. 104/250; 104/172.4; 104/249; 188/62
[58] Field of Search .................. 104/26.2, 172.1, 104/172.4, 249, 257; 198/814, 832.2; 188/38.5, 62, 180, 181 R, 181 C

[56] References Cited

U.S. PATENT DOCUMENTS

| | | | |
|---|---|---|---|
| 690,814 | 1/1902 | Acklin | 104/249 |
| 1,541,667 | 6/1925 | Southward et al. | 104/250 |
| 2,582,316 | 1/1952 | Doehler | 188/62 |
| 2,715,369 | 8/1955 | Doehler | 104/26.2 |
| 3,565,012 | 2/1971 | Nearman | 104/172.4 |
| 4,089,406 | 5/1978 | Teske et al. | 198/814 |
| 4,946,023 | 8/1990 | Heinhold et al. | 198/419.1 |
| 5,498,202 | 3/1996 | Vande Berg | 452/184 |

FOREIGN PATENT DOCUMENTS 1131255  6/1962  Germany ............... 104/26.2

Primary Examiner—S. Joseph Morano

[57] ABSTRACT

A control device for trolley shackles used to carry animal carcasses or parts thereof on a track for weighing and disposal. The control comprises a snubber device including extending teeth adapted so that each tooth can catch a shackle. Speed control of the teeth and their carrying device may be controlled by electrical or hydraulic devices in addition to mechanical brakes.

6 Claims, 1 Drawing Sheet

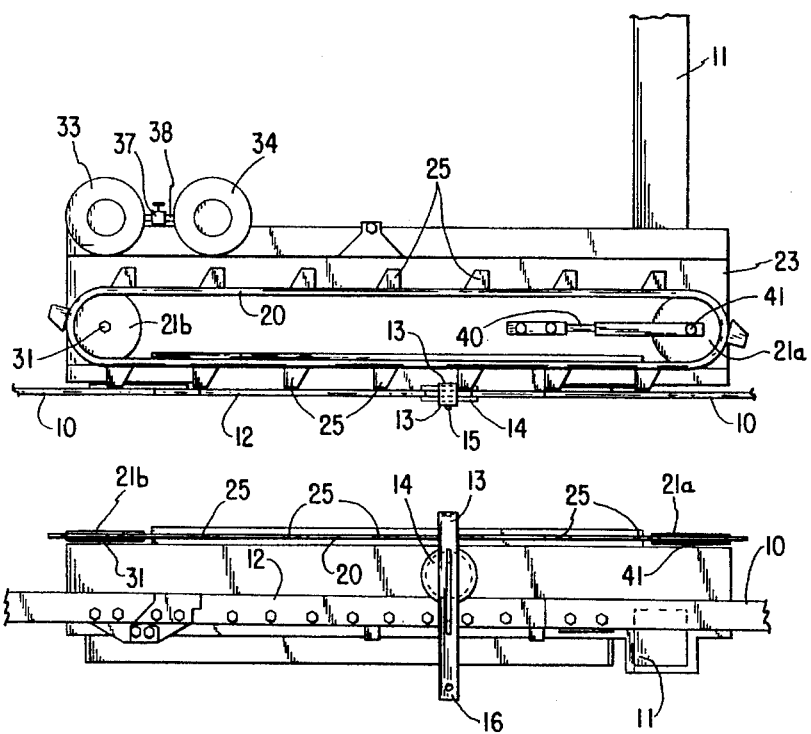
FIG. 1
FIG. 2
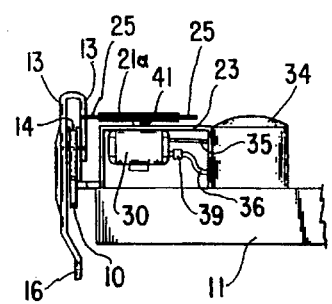
FIG. 3

SHACKLE SNUBBER FOR CARCASS CARRIERS

BACKGROUND AND SUMMARY OF THE INVENTION

This invention pertains to tracks for carrying animal carcasses to their distribution points and for weighing the carcasses in transport. In his previous U.S. Pat. No. 5,498,202, issued Mar. 12, 1996, applicant disclosed an identifying device for trolleys on such a track. In his co-pending application Ser. No. 08/334,957, filed Nov. 7, 1994, applicant discloses a weighing system especially adapted for weighing the goods carried by a pulled trolley which may run uphill on the track. The present invention makes a weighing device more useful and more accurate by assuring that a trolley on a downhill sloping track will remain relatively stable on the weighing track for a period long enough to get a correct weight.

In general, this invention is particularly designed for use in the meat packing industry where animals are slaughtered and meat carcasses are prepared for cutting into meat products for sale at retail. In such plants, the carcasses or, in some cases, stunned animals are attached to trolleys, and run down a rail to the distribution point whether that point is a slaughter area, a cutting room or a refrigerated room, there to be processed and held for shipment to another place where the meat cuts are prepared. Normally the rail or track slopes downwardly from the end where the trolleys are loaded to the distribution point so that gravity provides the impetus for movement on the track.

One of the functions performed while the trolley runs on the track is the weighing and identification of the carcass or portions thereof. In applicant's U.S. Pat. No. 5,498,202, noted above, a system for identification was disclosed, and in his application, Ser. No. 08/334,957 an improved track for the weighing device was shown. However, there must be a stabilized and relatively slower motion of the trolley for proper weighing. Both devices require that only a single trolley be on the separate weighing track at the point of weighing and identification. The present invention is a device to make certain that motion across the weighing section is of a speed such that proper readings may be obtained.

BRIEF DESCRIPTION OF THE DRAWINGS

FIG. 1 is a top plan view of a portion of the track including the separate weighing track and of the snubbing device adjacent the track, FIG. 2 is a side elevational view of the track with a trolley thereon, and FIG. 3 is an end view of the device of FIG. 1.

DESCRIPTION

Briefly this invention comprises a snubbing device for controlling the speed of a shackle trolley on a track while the trolley and its contents are being weighed. The snubber includes catches mounted on a belt and designed to contact the trolley. A speed control device controls the speed of the belt and therefore of the trolley.

More specifically and referring to the drawings, the device is used in connection with an elevated track 10. Adjacent the track, an identifying device 11 such as described in U.S. Pat. No. 5,498,202 may be mounted. The track is sloped downward from the left side of the figures in order to provide a downward rolling surface for the trolley. As more completely explained in my co-pending application noted before, the track may be broken so that a weighing segment 12 is provided. This segment is connected to a weighing device such as a strain gage scale so that while the trolley is on this segment, the weight can be sensed and recorded.

The trolley consists of a strap folded onto itself to provide legs 13 between which a flanged wheel 14 is journalled on its own axle 15. The wheel is adapted to run on the edge of the track 10. One leg of the strap extends downward as at 16 and provides a means for attachment of an identifying device such as described in my patent noted before together with a hook or other carrier for supporting the load, whether that load is a meat carcass or some other load. This trolley is thus adapted to roll downward on the track from left to right in FIGS. 1 and 2.

It will be readily seen that if the installed track 10 is sloped more steeply than necessary, or if some eager worker at the loading end of the track shoves the load on a trolley harder than necessary, there may well be a trolley rolling down the track at a speed in excess of the desired speed and that then the trolley will roll over the weighing segment too quickly for the weighing device to stabilize and give a correct reading of the weight. The new device described hereafter provides a means for controlling that speed.

Essentially, the control device consists of a belt 20 extending between the pulleys 21a and 21b. The pulleys are mounted on a platform 23 (FIG. 3) so that they turn about a nearly vertical axis. Teeth 25 are fixed to the belt 20 and extend from the belt outwardly to or across the track segment 12 in position to engage the inner leg 13 of the trolley. The teeth are spaced apart so that normally there will only be one trolley in one space between the teeth 25. Thus, each tooth 25 will engage a single trolley and keep that trolley to the speed of the belt 20. Because that belt extends substantially the full length of the weighing segment 12, the speed of the belt will then control the speed of the trolley across that segment 12 of the track.

In order to effectively control the speed of the belt, some exterior device is necessary. The preferred device is illustrated in the figures. This device includes a hydraulic pump 30, the shaft 31 of which is also the shaft of the pulley 21b. Thus, the rotation of that pulley 21b is restricted by the speed of rotation of the pump which, in turn, is controlled by the pressure or resistance to outflow from the pump 30.

In general, oil is pumped from a first tank 33 to a second tank 34. The inlet to the pump 30 from the first tank 33 may be a single pipe or tube 35, so that oil may flow freely from the tank 33 to the pump. Although other systems may be used to build pressure on the outlet and thereby to control speed, the preferred method is a closed system in which both tanks 33 and 34 are sealed and are not completely filled. Thus, discharge from the pump 30 through the tube 36 is against a certain amount of pressure in the second tank 34. A check valve 39 is preferably used in this line to make certain that the oil flows in only one direction.

The pressure at the outlet of the pump is controlled by controlling the pressure principally in the second tank 34. An adjustable valve 37 in the line 38 between the tanks allows adjustment of the pressure stabilization in the discharge system. Because the outlet pressure from the pump effectively controls the speed at which the pump rotates, the pressure in the second tank 34 can control the speed of rotation of the pulley 21b and therefore of the belt 20 and its teeth.

The principal reason for the closed system is to avoid surges. When a trolley 13 is the first one down the track, or if it is going considerably faster than normal, there may a rapid acceleration of the belt when the trolley hits the tooth 25. This acceleration would cause a tendency to turn the pump 30 at an accelerated—and jerky—pace. By providing an air cushion in the second tank 34, the surge can be absorbed by that air cushion, and thus damped to a proper speed quickly and expeditiously.

A belt tightener device 40—fastened to the platform 23 and operative on the idler pulley 21a—is desirable so that there can be proper tension in the belt 20 at all times. For that purpose, the shaft 41 may be held in a slotted opening which is common practice in the art and so is not shown.

In use, the trolley rolls down the track 10 towards the weighing segment 12. As it approaches that segment, it engages a tooth 25 on the belt 20 and, if it is the first trolley it starts the belt moving. As the pulley 21b rotates under impetus from the belt 20, the pump 30 starts working and regulates the speed of the belt 20 depending on the exit pressure from the pump, thus making certain that the trolley does not run too quickly over the weighing segment 12.

It will be apparent that electrical brake devices similar to the hydraulic means described can be used. Applicant also conceives that plain friction brakes might also accomplish the purpose.

I claim as my invention:

1. A snubbing device to control the speed at which a trolley rolls across a sloping carrying track, said carrying track having a weighing segment, said snubbing device comprising a platform adjacent said weighing segment, belt means movably mounted on said platform parallel to said weighing segment, said belt means including at least a first pulley and a second pulley spaced apart in a direction substantially parallel to said weighing segment, said first pulley being an idler pulley, speed control means including a hydraulic pump in driven engagement with said second pulley and adapted to pump oil against a discharge pressure, and means on said belt means to engage said trolley whereby motion is conveyed from said trolley to said belt means and is controlled by said speed control means.

2. The snubbing device of claim 1 in which said idler pulley is adjustably mounted on said platform, belt tightening means engaged between said platform and said idler pulley whereby the tension in said belt can be controlled.

3. The snubbing device of claim 1 in which said speed control means includes a closed system including at least one tank to provide surge control in said system.

4. The snubbing device of claim 1 in which said speed control means includes a closed system having an inlet tank and a discharge tank, said discharge tank including an air space to provide surge control, said pump discharging through a discharge line into said discharge tank, check valve means in said discharge line between said pump and discharge tank.

5. The snubbing device of claim 4 in which an intermediate line provides transmission of said oil from said discharge tank to said inlet tank, controlled valve means in said intermediate line whereby pressure in said discharge tank can be controlled.

6. The snubbing device of claim 1 in which said pump has an inlet and a discharge, adjustable valve means in said discharge to control said discharge pressure.

\* \* \* \* \*